United States Patent
Luo

(10) Patent No.: US 10,740,018 B2
(45) Date of Patent: Aug. 11, 2020

(54) DATA MIGRATION METHOD AND APPARATUS APPLIED TO COMPUTER SYSTEM, AND COMPUTER SYSTEM

(71) Applicant: HUAWEI TECHNOLOGIES CO., LTD., Shenzhen, Guangdong (CN)

(72) Inventor: Qingchao Luo, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 178 days.

(21) Appl. No.: 15/980,630

(22) Filed: May 15, 2018

(65) Prior Publication Data

US 2018/0267739 A1    Sep. 20, 2018

Related U.S. Application Data

(63) Continuation of application No. PCT/CN2015/096285, filed on Dec. 3, 2015.

(51) Int. Cl.
| | |
|---|---|
| G06F 12/00 | (2006.01) |
| G06F 3/06 | (2006.01) |
| G06F 16/13 | (2019.01) |
| G06F 12/02 | (2006.01) |
| G06F 13/28 | (2006.01) |

(52) U.S. Cl.
CPC .......... G06F 3/0647 (2013.01); G06F 3/0604 (2013.01); G06F 3/0683 (2013.01); G06F 12/0246 (2013.01); G06F 13/28 (2013.01); G06F 16/13 (2019.01)

(58) Field of Classification Search
None
See application file for complete search history.

(56) References Cited

U.S. PATENT DOCUMENTS

| | | | |
|---|---|---|---|
| 6,014,695 A | 1/2000 | Yamashita et al. | |
| 6,021,462 A | 2/2000 | Minow et al. | |
| 9,256,373 B1* | 2/2016 | Liang | G06F 3/0619 |
| 2002/0144027 A1 | 10/2002 | Schmisseur | |
| 2007/0136548 A1 | 6/2007 | Mane | |
| 2009/0164691 A1 | 6/2009 | Wang et al. | |
| 2009/0292861 A1 | 11/2009 | Kanevsky et al. | |
| 2012/0136958 A1 | 5/2012 | Zhu et al. | |
| 2015/0012712 A1* | 1/2015 | Penner | G06F 12/0862 711/137 |
| 2016/0277245 A1 | 9/2016 | Wei | |

FOREIGN PATENT DOCUMENTS

| | | |
|---|---|---|
| CN | 101539894 A | 9/2009 |
| CN | 102480516 A | 5/2012 |
| CN | 102567244 A | 7/2012 |
| CN | 104579695 A | 4/2015 |
| CN | 104965757 A | 10/2015 |

* cited by examiner

*Primary Examiner* — Jason W Blust

(74) *Attorney, Agent, or Firm* — Womble Bond Dickinson (US) LLP

(57) ABSTRACT

A data migration method is disclosed, including: determining a first address of target data that is to be migrated from an internal storage device to an external storage device, the first address is a logical address of the internal storage device; calculating a physical address of the target data in the internal storage device based on the first address; constructing a scatter gather list, where the scatter gather list includes the physical address of the target data in the internal storage device; sending a migration instruction to a direct memory access engine.

12 Claims, 4 Drawing Sheets

DATA MIGRATION METHOD AND APPARATUS APPLIED TO COMPUTER SYSTEM, AND COMPUTER SYSTEM

CROSS-REFERENCE TO RELATED APPLICATIONS

This application is a continuation of International Application No. PCT/CN2015/096285, filed on Dec. 3, 2015, the disclosure of which is hereby incorporated by reference in its entirety.

TECHNICAL FIELD

The present disclosure relates to the field of computer technologies, and in particular, to a data migration method and apparatus applied to a computer system, and a computer system.

BACKGROUND

Memories may generally fall into two types: a volatile memory and a nonvolatile memory (NVM). The NVM includes multiple models, and one model is a persistent memory (PM). The persistent memory is a programming model that features direct random access and non-volatility, and may provide new storage behavior for a file system or a database by using a conventional virtual memory management interface.

In the prior art, when data in the persistent memory used as an internal storage device is migrated to an external storage device, first, the data is be read from the persistent memory to a random access memory (RAM), and then a scatter gather list (SGL) is constructed based on a physical address of the data in the RAM. A direct memory access (DMA) engine reads the data from the RAM based on the scatter gather list, and writes the data into a hard disk. A memory controller should be accessed during each operation performed on the persistent memory and the random access memory. Therefore, the memory controller is accessed three times in total in the foregoing data transmission procedure. Consequently, bandwidth of the memory controller is greatly affected.

SUMMARY

Embodiments of the present disclosure provide a data migration method and apparatus applied to a computer system, and a computer system, so that impact on bandwidth of a memory controller can be reduced in a data migration process between an internal storage device and an external storage device.

A first aspect of the embodiments of the present disclosure provides a data migration method applied to a computer system. The method is used to migrate target data stored in an internal storage device to an external storage device when a persistent memory is used as the internal storage device and an access manner in which an operating system in the computer system accesses the internal storage device is a volume access manner or a file access manner. The method includes: before migrating the target data, obtaining a logical address of the target data in the internal storage device; calculating a physical address of the target data in the internal storage device based on the logical address; constructing a scatter gather list, where the scatter gather list includes the physical address of the target data in the internal storage device; and sending, to a DMA engine, a migration instruction that includes information about the scatter gather list, where the information about the scatter gather list includes the physical address of the target data in the internal storage device, and the migration instruction is used to instruct the DMA engine to: obtain the target data from the internal storage device based on the physical address, and write the target data into the external storage device.

In this method, the physical address of the target data in the internal storage device is calculated based on the logical address of the target data in the internal storage device. In this way, the SGL may be directly generated based on the physical address of the target data in the internal storage device, and there is no need to read the target data from the internal storage device to a RAM and then construct an SGL based on a physical address of the target data in the RAM. Because an operation performed on the RAM is reduced in this process, a quantity of times of accessing a memory controller is reduced, and impact on bandwidth of the memory controller is further reduced in a data migration process.

When the access manner for the internal storage device is the volume access manner, the logical address of the target data includes a volume identifier, an offset address, and a length, and the volume identifier is an identifier of a logical volume to which the target data belongs.

When the access manner for the internal storage device is the file access manner, the logical address of the target data includes a file identifier, an offset address, and a length, and the file identifier is an identifier of a file to which the target data belongs in a file system.

In a first possible implementation of the first aspect, when the access manner for the internal storage device is the volume access manner, the calculating a physical address of the target data in the internal storage device based on the logical address of the target data in the internal storage device includes: determining, based on the volume identifier included in the logical address, a physical start address of the logical volume to which the target data belongs in the internal storage device; calculating a physical start address of the target data in the internal storage device based on the physical start address of the logical volume and the offset address included in the logical address; and determining the physical address of the target data based on the physical start address of the target data in the internal storage device and a length of the target data. In this implementation, the physical address of the target data in the internal storage device can be simply and quickly calculated.

With reference to the first possible implementation of the first aspect, in a second possible implementation, the computer system stores a mapping table. The mapping table records a physical start address and a length that are of a logical volume corresponding to each volume identifier. A physical start address corresponding to the volume identifier is queried in the mapping table, so as to determine the physical start address of the logical volume to which the target data belongs in the internal storage device. The physical start address of the logical volume in the internal storage device can be quickly and accurately obtained by performing a query in the mapping table.

With reference to the first possible implementation of the first aspect, in a third possible implementation, a sum of the physical start address of the logical volume to which the target data belongs and the offset address included in the logical address of the target data is calculated, where the physical start address of the target data in the internal storage device is the sum.

In a fourth possible implementation of the first aspect, when the access manner for the internal storage device is the file access manner, the calculating a physical address of the target data in the internal storage device based on the logical address of the target data in the internal storage device includes: obtaining, based on the file identifier included in the logical address, a physical start address of the file to which the target data belongs in the internal storage device; calculating a physical start address of the target data in the internal storage device based on the physical start address of the file and the offset address included in the logical address; and determining the physical address of the target data based on the physical start address of the target data in the internal storage device and a length of the target data. In this implementation, the physical address of the target data in the internal storage device can be simply and quickly calculated.

With reference to the fourth possible implementation of the first aspect, in a fifth possible implementation, in a process of constructing the file system in the internal storage device, the computer system stores a mapping table. The mapping table records full path information of a file corresponding to each file identifier. The full path information includes a physical start address of the file. A physical start address corresponding to the file identifier is queried in the mapping table, so as to determine the physical start address of the file to which the target data belongs in the internal storage device. The physical start address of the logical volume in the internal storage device can be quickly and accurately obtained by performing a query in the mapping table.

With reference to the fourth possible implementation of the first aspect, in a sixth possible implementation, when a process in a processor accesses the file system based on the logical address of the target data, the operating system first opens a target file that is to be accessed by the process and in which the target data is located, and then performs a read operation on the opened target file. In a process in which the operating system opens the target file, the operating system invokes a kernel, and the kernel allocates a file identifier to the target file to be accessed by the process. In a process of performing the read operation on the target file, the process may identify the to-be-accessed target file based on the file identifier. When the process accesses the file system, description information of all opened files accessed by the process is maintained in the process. Description information of the file to which the target data belongs may be found by using the file identifier as an index, and the physical start address of the file in the internal storage device is found in the description information of the file.

With reference to the fourth possible implementation of the first aspect, in a seventh possible implementation, a sum of the physical start address of the file to which the target data belongs and the offset address included in the logical address of the target data is calculated, where the physical start address of the target data in the internal storage device is the sum.

A second aspect of the embodiments of the present disclosure provides a data migration method applied to a computer system. The method is used to migrate target data stored in an external storage device to an internal storage device when a persistent memory is used as the internal storage device and an access manner in which an operating system in the computer system accesses the internal storage device is a volume access manner or a file access manner. The method includes: before migrating the target data, obtaining a logical address to which the target data is to be migrated in the internal storage device; calculating, based on the logical address, a physical address to which the target data is to be migrated in the internal storage device; constructing a scatter gather list, where the scatter gather list includes the physical address to which the target data is to be migrated in the internal storage device; and sending, to a DMA engine, a migration instruction that includes information about the scatter gather list, where the information about the scatter gather list includes the physical address to which the target data is to be migrated in the internal storage device, and the migration instruction is used to instruct the DMA engine to: obtain the target data from the external storage device, and write the target data into the internal storage device based on the physical address.

In this method, the corresponding physical address is calculated based on the logical address to which the target data is to be migrated in the internal storage device. In this way, the scatter gather list may be directly constructed based on the physical address, so that the DMA engine may write the target data into the internal storage device based on the scatter gather list, and there is no need, as in the background, to first migrate the data from the external storage device to a RAM and then construct an SGL based on a physical address of the data in the RAM. Because an operation performed on the RAM is reduced, a quantity of times of accessing a memory controller is reduced, and impact on bandwidth of the memory controller is further reduced.

When the access manner for the internal storage device is the volume access manner, the logical address to which the target data is to be migrated in the internal storage device includes a volume identifier, an offset address, and a length, and the volume identifier is an identifier of a logical volume to which the target data belongs.

When the access manner for the internal storage device is the file access manner, the logical address to which the target data is to be migrated in the internal storage device includes a file identifier, an offset address, and a length, and the file identifier is an identifier of a file to which the target data belongs in a file system.

In a first possible implementation of the second aspect, when the access manner for the internal storage device is the volume access manner, the calculating, based on the logical address to which the target data is to be migrated in the internal storage device, a physical address to which the target data is to be migrated in the internal storage device includes: determining, based on the volume identifier included in the logical address, a physical start address of the logical volume to which the target data is to be migrated in the internal storage device; calculating, based on the physical start address of the logical volume and the offset address included in the logical address, a physical start address to which the target data is to be migrated in the internal storage device; and determining, based on the physical start address to which the target data is to be migrated in the internal storage device and a length of the target data, the physical address to which the target data is to be migrated in the internal storage device. In this implementation, the physical address of the target data in the internal storage device can be simply and quickly calculated.

With reference to the first possible implementation of the second aspect, in a second possible implementation, the computer system stores a mapping table. The mapping table records a physical start address and a length that are of a logical volume corresponding to each volume identifier. A physical start address corresponding to the volume identifier is queried in the mapping table, so as to determine the physical start address of the logical volume to which the target data is to be migrated in the internal storage device.

The physical start address of the logical volume in the internal storage device can be quickly and accurately obtained by performing a query in the mapping table.

With reference to the first possible implementation of the second aspect, in a third possible implementation, a sum of the physical start address of the logical volume to which the target data is to be migrated and the offset address included in the logical address of the target data is calculated, where the physical start address of the target data in the internal storage device is the sum.

In a fourth possible implementation of the second aspect, when the access manner for the internal storage device is the file access manner, the calculating, based on the logical address to which the target data is to be migrated in the internal storage device, a physical address to which the target data is to be migrated in the internal storage device includes: obtaining, based on the file identifier included in the logical address, a physical start address of the file to which the target data is to be migrated in the internal storage device; calculating, based on the physical start address of the file and the offset address included in the logical address, a physical start address to which the target data is to be migrated in the internal storage device; and determining, based on the physical start address to which the target data is to be migrated in the internal storage device and a length of the target data, the physical address to which the target data is to be migrated in the internal storage device. In this implementation, the physical address of the target data in the internal storage device can be simply and quickly calculated.

With reference to the fourth possible implementation of the second aspect, in a fifth possible implementation, in a process of constructing the file system in the internal storage device, the computer system stores a mapping table. The mapping table records full path information of a file corresponding to each file identifier. The full path information includes a physical start address of the file. A physical start address corresponding to the file identifier is queried in the mapping table, so as to determine the physical start address of the file to which the target data is to be migrated in the internal storage device. The physical start address of the logical volume in the internal storage device can be quickly and accurately obtained by performing a query in the mapping table.

With reference to the fourth possible implementation of the second aspect, in a sixth possible implementation, when a process in a processor accesses the file system based on the logical address of the target data, the operating system first opens a target file that is to be accessed by the process and in which the target data is located, and then performs a write operation on the opened target file. In a process in which the operating system opens the target file, the operating system invokes a kernel, and the kernel allocates a file identifier to the target file to be accessed by the process. In a process of performing the write operation on the target file, the process may identify the to-be-accessed target file based on the file identifier. When the process accesses the file system, description information of all opened files accessed by the process is maintained in the process. Description information of the file to which the target data is to be migrated may be found by using the file identifier as an index, and the physical start address of the file in the internal storage device is found in the description information of the file.

With reference to the fourth possible implementation of the second aspect, in a seventh possible implementation, a sum of the physical start address of the file to which the target data is to be migrated and the offset address included in the logical address of the target data is calculated, where the physical start address to which the target data is to be migrated in the internal storage device is the sum.

According to a third aspect, an embodiment of the present disclosure further provides a data migration apparatus applied to a computer system, configured to implement the method in the first aspect. The data migration apparatus applied to a computer system includes: a determining module, a calculation module, a construction module, and a sending module. Each module completes a specific function. All the modules cooperate with each other to implement the data migration method applied to a computer system that is provided in the first aspect and the first to the seventh possible implementations of the first aspect.

According to a fourth aspect, an embodiment of the present disclosure provides a computer system. The computer system includes a processor, an internal storage device, and an external storage device. The internal storage device may be a persistent memory. An access manner in which an operating system in the computer system accesses the internal storage device is a volume access manner or a file access manner. The internal storage device stores target data. The target data is data that is to be migrated from the internal storage device to the external storage device. The processor may be a central processing unit. The processor is specifically configured to execute the data migration method applied to a computer system that is provided in the first aspect and the first to the seventh possible implementations of the first aspect.

According to a fifth aspect, an embodiment of the present disclosure further provides a computer readable storage medium. The storage medium stores an instruction or a software module used to implement the data migration method applied to a computer system that is described in the first aspect.

According to a sixth aspect, an embodiment of the present disclosure further provides a data migration apparatus applied to a computer system, configured to implement the method in the second aspect. The data migration apparatus applied to a computer system includes: a determining module, a calculation module, a construction module, and a sending module. Each module completes a specific function. All the modules cooperate with each other to implement the data migration method applied to a computer system that is provided in the second aspect and the first to the seventh possible implementations of the second aspect.

According to a seventh aspect, an embodiment of the present disclosure provides a computer system. The computer system includes a processor, an internal storage device, and an external storage device. The internal storage device may be a persistent memory. An access manner in which an operating system in the computer system accesses the internal storage device is a volume access manner or a file access manner. The external storage device is configured to store target data. The target data is data that is to be migrated from the external storage device to the internal storage device. The processor may be a central processing unit. The processor is specifically configured to execute the data migration method applied to a computer system that is provided in the second aspect and the first possible implementation to the seventh possible implementation of the second aspect.

According to an eighth aspect, an embodiment of the present disclosure further provides a computer readable storage medium. The storage medium stores an instruction or a software module used to implement the data migration method applied to a computer system that is described in the second aspect and the first possible implementation to the seventh possible implementation of the second aspect.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

To make a person skilled in the art understand the technical solutions in the present disclosure better, the following clearly describes the technical solutions in the embodiments of the present disclosure with reference to the accompanying drawings in the embodiments of the present disclosure. Apparently, the described embodiments are only some rather than all of the embodiments of the present disclosure.

For ease of understanding, the following explains some concepts in the present disclosure.

DMA is a hardware mechanism that may implement bidirectional data transmission between an external device and a system memory without participation of a processor. In a DMA data transmission process, a source physical address and a destination physical address each should be contiguous. However, in some computer systems, a contiguous memory address is not necessarily contiguous physically. Therefore, DMA transmission should be completed at multiple times. A solution to this problem is to use an SGL to describe storage space that is not physically contiguous, and then send information about the SGL to a DMA engine. After completing transmission of a block of physically contiguous data, the DMA engine does not need to initiate interruption, but transmits a next block of physically contiguous data based on the SGL, and does not initiate interruption until the transmission is completed.

Figure 1:
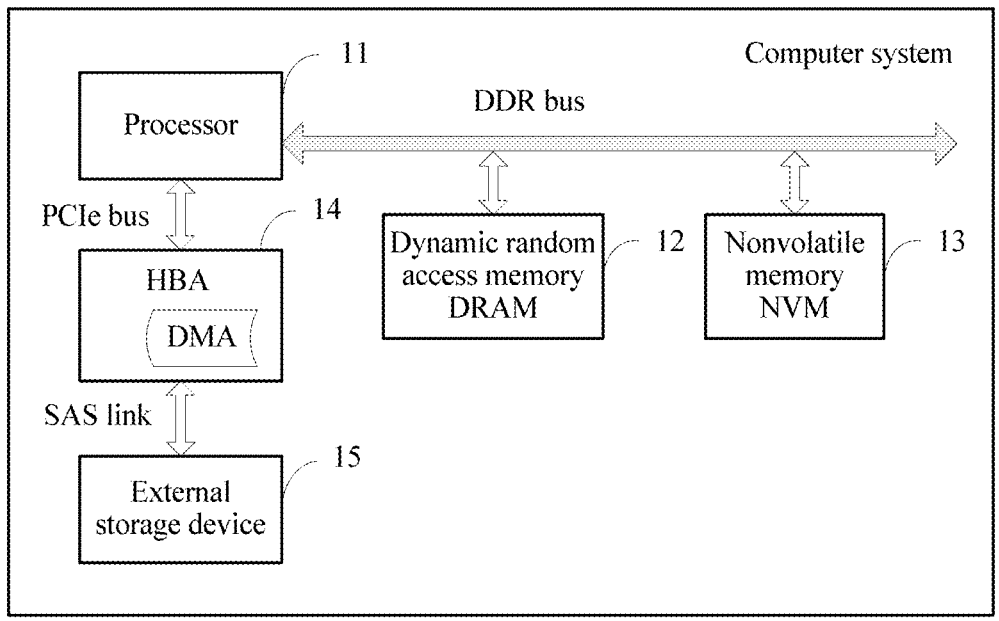
FIG. 1 is a schematic structural diagram of an embodiment of a computer system according to the present disclosure.

As shown in FIG. 1, FIG. 1 is a schematic structural diagram of an embodiment of a computer system according to the present disclosure. The computer system includes a processor 11, a dynamic random access memory (DRAM) 12, a nonvolatile memory (NVM) 13, a host bus adapter (HBA) 14, and an external storage device 15.

The processor 11 may be a central processing unit (CPU). The CPU 11 is a core of the computer system. The CPU 11 may invoke different software programs in the computer system to implement different functions. For example, the CPU 11 can implement access to the internal storage device 12 and the external storage device 15. It may be understood that in this embodiment of the present disclosure, the CPU is only an example of the processor 11. In addition to the CPU, the processor 11 may be another application-specific integrated circuit (ASIC), or one or more integrated circuits configured to implement this embodiment of the present disclosure.

The DRAM 12 communicates with the processor 11 by using a double data rate (DDR) bus. The processor 11 can access the DRAM 12 at a high speed, and perform a read or write operation on any storage unit in the DRAM 12. The DRAM 12 has an advantage of a high access speed. Therefore, the DRAM is usually used as a primary memory. The DRAM 12 is usually configured to: store various types of software running in an operating system, and input and output data, information exchanged with the external storage device, and the like. However, the DRAM 12 is volatile. When a computer is powered off, information in the DRAM 12 is no longer stored. A person skilled in the art may learn that the DRAM is one of volatile memories, and another random access memory (RAM) may be used as a memory in the computer system in an actual application. For example, a static random access memory (SRAM) may be used as a memory in the computer system.

The NVM 13 communicates with the processor 11 by using the DDR bus, and is used as a memory in the computer system 100 together with the DRAM 12. It should be noted that an internal storage device described in the following is the NVM 13 in an architectural diagram shown in FIG. 1. A new NVM is characterized by a high access speed and non-volatility. In addition, because the new NVM can perform addressing by byte (Byte), and write data into a nonvolatile memory in a unit of bit (bit), the new NVM can be used as a memory. Compared with the DRAM 12, because the NVM 13 is characterized by non-volatility, the NVM 13 can better store data. In this embodiment of the present disclosure, the NVM 13 is configured as a persistent memory. In this manner, even though a power outage occurs in the computer system, data stored in the NVM 13 is not lost. In this embodiment of the present disclosure, an access manner in which an operating system in the computer system accesses the persistent memory may be a volume access manner or a file access manner. In the volume access manner, the persistent memory is presented as multiple logical volumes. In the file access manner, the persistent memory is presented as a file system including multiple files.

A storage medium of the external storage device 15 should be nonvolatile. When the computer is powered off, data stored in the external storage device is still stored. In addition, a storage capacity of the external storage device is relatively large. A memory used as the external storage device may be another nonvolatile storage device that can store data, for example, a magnetic disk, a solid state drive (SSD), a mechanical hard disk (Hard Disk Drive, HDD), an optical disc, or a storage array. The external storage device 15 and the HBA 14 are connected by using a serial attached small computer system interface (Serial Attached SCSI, SAS for short) link. The processor and the HBA are connected by using a Peripheral Component Interconnect Express (PCI-E) bus. The HBA 13 includes a DMA engine. The DMA engine is configured to implement data transmission between the internal storage device and the external storage device connected to the HBA 13.

In an actual application, when the internal storage device is a persistent memory, and if data in the internal storage device is migrated to the external storage device in a DMA manner, because an address that is of target data stored in the internal storage device and is observed by the CPU is a logical address (that is, a virtual address) instead of an actual physical address, the CPU cannot generate an SGL based on the logical address of the target data, but first migrates the target data from the internal storage device to a RAM, and then generates an SGL based on a physical address of the target data in the RAM, so that the DMA engine can migrate data from the nonvolatile internal storage device to the external storage device based on the generated SGL.

It may be understood that the architectural diagram of the computer system provided in FIG. 1 is only an application scenario in which the NVM is used as a memory. In an actual application, the memory in the computer system may include only the NVM, but does not include the DRAM. Because an application scenario in which data in the internal storage device used as the persistent memory is migrated to the external storage device is mainly used in this embodiment of the present disclosure, a specific structure of the computer system is not limited in this embodiment of the present disclosure, provided that the computer system includes the internal storage device used as the persistent memory.

Figure 2:
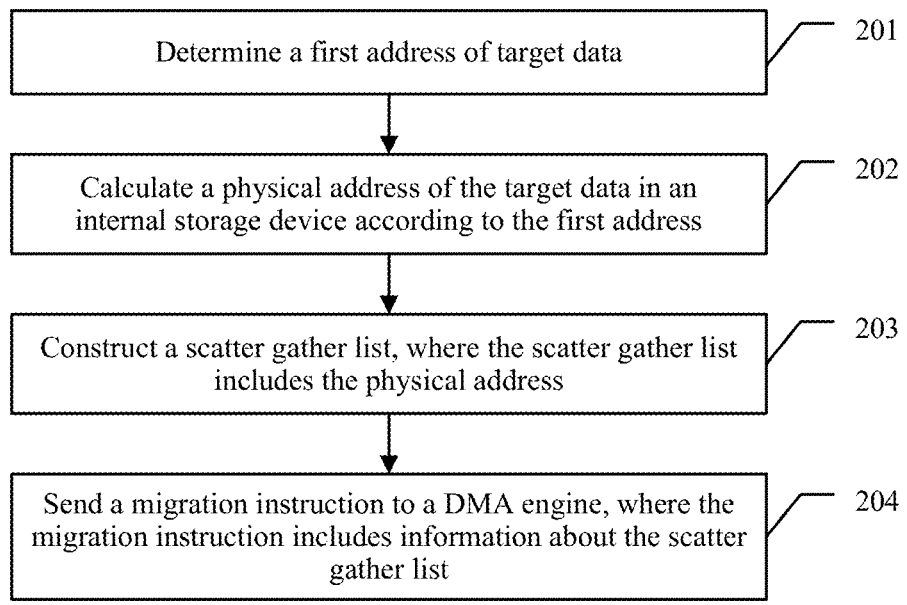
FIG. 2 is a schematic flowchart of an embodiment of a data migration method applied to a computer system according to an embodiment of the present disclosure.

Referring to FIG. 2, FIG. 2 is a schematic flowchart of an embodiment of a data migration method applied to a computer system according to the present disclosure. The data migration method shown in FIG. 2 may be applied to the computer system shown in FIG. 1. As shown in FIG. 2, the data migration method applied to a computer system in this embodiment includes the following blocks.

201. Determine a first address of target data.

In this embodiment, the target data is stored in an internal storage device in the computer system shown in FIG. 1, and is to be migrated from the internal storage device to an external storage device. The first address is a logical address of the target data in the internal storage device.

When an access manner for the internal storage device is a volume access manner, the internal storage device is presented as multiple logical volumes from a perspective of a processor. The first address includes a volume identifier, an offset address, and a length. The volume identifier is an identifier of a logical volume to which the target data belongs. The computer system stores a mapping table. The mapping table records a physical start address and a length that are of a logical volume corresponding to each volume identifier.

Specifically, for example, a 128 GB internal storage device includes two logical volumes. IDs of the two logical volumes are respectively 1 and 2. A physical address of a logical volume whose ID is 1 is from 0 GB to 64 GB. A physical address of a logical volume whose ID is 2 is from 64 GB to 128 GB. When a physical address of the target data stored in the internal storage device is from 66 GB to 72 GB, the first address of the target data includes a logical volume ID 2, a 2 GB offset address, and a 6 GB length.

When an access manner for the internal storage device is a file access manner, the internal storage device is presented, from a perspective of a processor, as a file system used to manage multiple files. The first address includes a file identifier, an offset address, and a length. The file identifier is an identifier of a file to which the target data belongs in the file system. The file identifier may be some digits or another file descriptor (or a file handle).

202. Calculate a physical address of the target data in an internal storage device based on the first address.

Figure 3:
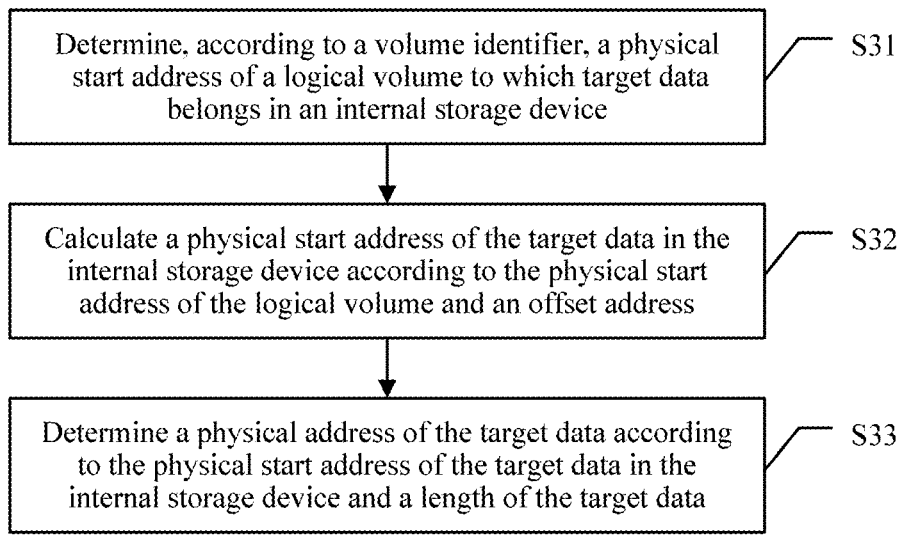
FIG. 3 is a schematic flowchart of an embodiment of an address calculation method when an access manner for an internal storage device is a volume access manner.

The following describes one of calculation methods by using an example in which the access manner for the internal storage device is the volume access manner. As shown in FIG. 3, FIG. 3 is a schematic flowchart of an embodiment of an address calculation method existing when an access manner for an internal storage device is a volume access manner. The address calculation method includes the following blocks.

S31. Determine, based on a volume identifier, a physical start address of a logical volume to which the target data belongs in the internal storage device.

Specifically, the physical start address of the logical volume is queried in the mapping table described in block 201 and by using the ID of the logical volume in which the target data is located. For example, paddr_start_vol=volume_table[v_id], where volume_table[ ] is a function for performing a query in the mapping table, v_id is the ID of the logical volume to which the target data belongs, and paddr_start_vol is the physical start address of the logical volume to which the target data belongs.

S32. Calculate a physical start address of the target data in the internal storage device based on the physical start address of the logical volume and an offset address.

Specifically, if the offset address included in the first address is v_addr, and m_addr is the physical start address of the target data in the internal storage device, m_addr=paddr_start_vol+v_addr.

S33. Determine the physical address of the target data based on the physical start address of the target data in the internal storage device and a length of the target data.

After the physical start address m_addr of the target data in the internal storage device is calculated, it is determined that the physical address of the target data in the internal storage device includes m_addr and the length of the target data.

Specifically, for example, if the first address of the target data includes a logical volume ID 2, a 2 GB offset address, and a 6 GB length, it may be found, based on the logical volume ID 2 in the mapping table that is corresponding to the internal storage device and is given in block 201 by using an example, that a physical start address of a logical volume corresponding to the ID is 64 GB. Because the offset address that is of the target data and is included in the first address is 2 GB, the physical start address of the target data in the internal storage device may be 64 GB+2 GB=66 GB by means of calculation. Because the length of the target data is known, the physical address of the target data in the internal storage device includes the 66 GB physical start address and the 2 GB data length.

The following describes one of calculation methods by using an example in which the access manner for the internal storage device is the file access manner.

Figure 4:
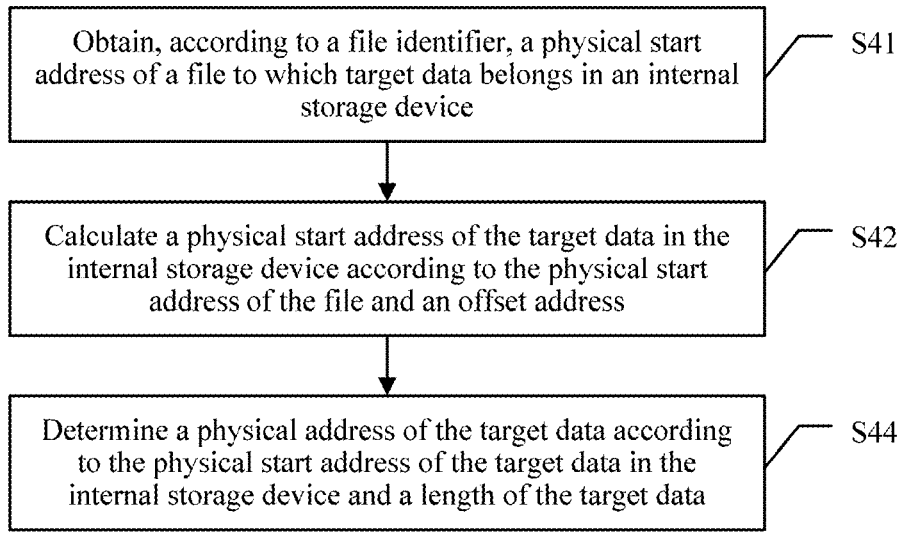
FIG. 4 is a schematic flowchart of an embodiment of an address calculation method when an access manner for an internal storage device is a file access manner.

As shown in FIG. 4, FIG. 4 is a schematic flowchart of an embodiment of an address calculation method existing when an access manner for an internal storage device is a file access manner. The address calculation method includes the following blocks.

S41. Obtain, based on a file identifier, a physical start address of a file to which the target data belongs in the internal storage device.

In an actual application, in a process of constructing the file system in the internal storage device, the computer system stores a mapping table. The mapping table records full path information of a file corresponding to each file identifier. The full path information includes a physical start address of the file. In this block, the physical start address of the file to which the target data belongs in the internal storage device may be obtained based on the file identifier and the mapping table stored in the file system.

Alternatively, when a process in a processor accesses the file system based on the logical address of the target data, an operating system first opens a target file that is to be accessed by the process and in which the target data is located, and then performs a read operation on the opened target file. In a process in which the operating system opens the target file, the operating system invokes a kernel, and the kernel allocates a file identifier to the target file to be accessed by the process. The file identifier is a unique identifier for identifying the target file by the current process. In a process of performing the read operation on the target file, the process may identify the to-be-accessed target file based on the file identifier. When the process accesses the file system, description information of all opened files accessed by the process is maintained in the process. Description information of the file to which the target data belongs may be found by using the file identifier as an index, and the physical start address of the file in the internal storage device is found in the description information of the file.

S42. Calculate a physical start address of the target data in the internal storage device based on the physical start address of the file and an offset address.

Specifically, the physical start address of the target data in the internal storage device is a sum of the physical start address of the file and the offset address.

S43. Determine the physical address of the target data based on the physical start address of the target data in the internal storage device and a length of the target data.

After the physical start address m_addr of the target data in the internal storage device is calculated, it is determined that the physical address of the target data in the internal storage device includes m_addr and the length of the target data.

The foregoing description is only an example of "calculating a physical address of the target data in an internal storage device based on the first address", and no limitation is imposed.

203. Construct a scatter gather list, where the scatter gather list includes the physical address.

Specifically, the SGL is defined as follows:

```
struct scatterlist {
    unsigned long page_link;    //a physical start address of a
page on which the target data is located in the internal storage device
    unsigned int offset;        //an offset on the page
    unsigned int length;        //a length on the page
    dma_addr_t dma_address;    // typedef u64 dma_addr_t; a
DMA address defined according to 64 bits
}.
```

The physical address of the target data in the internal storage device is filled into the scatter gather list. Specifically, an sg_list pointer is obtained, and SGL information is filled in based on a DMA specification. The physical address of the target data in the internal storage device is filled into the sg_list pointer.

For example, the physical address of the target data in the internal storage device includes 22 GB to 34 GB, 39 GB to 44 GB, and 56 GB to 78 GB, and the physical addresses are successively filled into the sg_list pointer.

204. Send a migration instruction to a DMA engine, where the migration instruction includes information about the scatter gather list.

After constructing the SGL, to migrate the target data to the external storage device, the processor is to send the migration instruction to the DMA engine in an HBA connected to the external storage device. The migration instruction includes an address to which the target data is to be migrated in the external storage device and the information about the SGL. The information about the SGL includes the physical address of the target data in the internal storage device. The migration instruction is used to instruct the DMA engine to: read the target data from the internal storage device based on the physical address in the SGL, and write the target data into the external storage device based on the address to which the target data is to be migrated in the external storage device.

In this embodiment, the processor calculates the physical address of the target data in the internal storage device based on the logical address of the target data in the internal storage device. In this way, the SGL may be directly generated based on the physical address of the target data in the internal storage device, and there is no need to read the target data from the internal storage device to a RAM and then construct an SGL based on a physical address of the target data in the RAM. Because an operation performed on the RAM is reduced, a quantity of times of accessing a memory controller is reduced, and impact on bandwidth of the memory controller is further reduced.

The foregoing describes the method for migrating the target data from the internal storage device in the operating system to the external storage device, and the following describes a method for migrating the target data from the external storage device in the operating system to the internal storage device.

Figure 5:
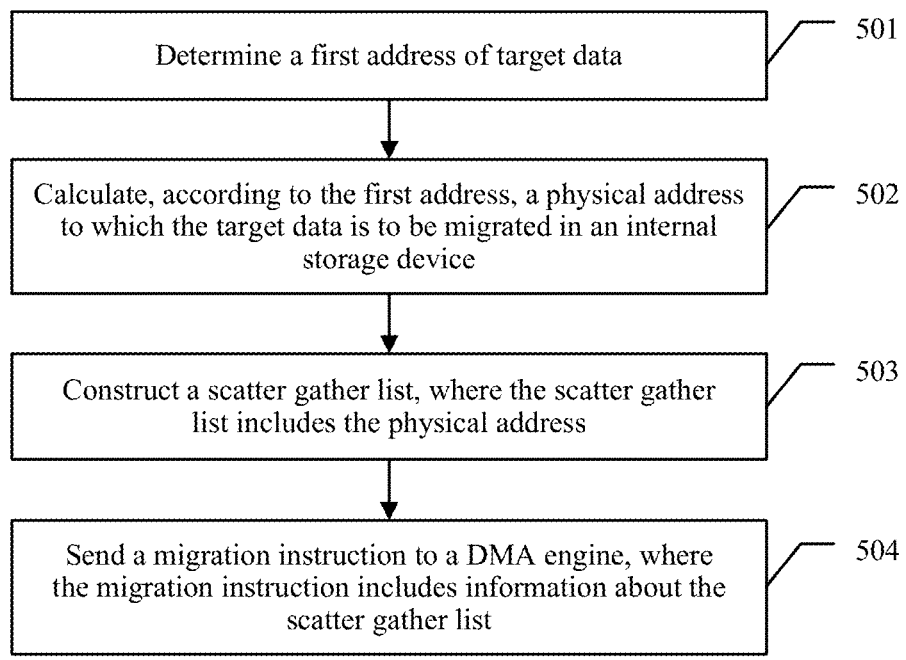
FIG. 5 is a schematic flowchart of another embodiment of a data migration method applied to a computer system according to an embodiment of the present disclosure.

As shown in FIG. 5, FIG. 5 is a schematic flowchart of an embodiment of a data migration method applied to a computer system according to the present disclosure. The data migration method shown in FIG. 5 may also be applied to the computer system shown in FIG. 1. As shown in FIG. 5, the data migration method applied to a computer system in this embodiment includes the following blocks.

501. Determine a first address of target data.

In this embodiment, the target data is stored in an external storage device in the computer system shown in FIG. 1, and is be migrated from the external storage device to an internal storage device. The first address is a destination address to which the target data is to be migrated in the internal storage device. Because the internal storage device is a nonvolatile memory, and an access manner for the internal storage device is a volume access manner or a file access manner, the first address is a logical address. For a specific explanation, refer to the description in block 201. Details are not described herein.

502. Calculate, based on the first address, a physical address to which the target data is to be migrated in an internal storage device.

In this embodiment, for a method for calculating the physical address, refer to the description in block 202. Details are not described herein again.

503. Construct a scatter gather list, where the scatter gather list includes the physical address.

Specifically, the SGL is defined as follows:

```
struct scatterlist {
unsigned long page_link; //a physical start address of a page into which
the target data is to be written in the internal storage device
    unsigned int offset;        //an offset on the page
    unsigned int length;        //a length on the page
    dma_addr_t dma_address;    // typedef u64 dma_addr_t; a DMA
address defined according to 64 bits
    }.
```

The physical address to which the target data is to be migrated in the internal storage device is filled into the scatter gather list. Specifically, an sg_list pointer is obtained, and SGL information is filled in according to a DMA specification. The physical address to which the target data is to be migrated in the internal storage device is filled into the sg_list pointer.

For example, the physical address to which the target data is to be migrated in the internal storage device includes 22 GB to 34 GB, 39 GB to 44 GB, and 56 GB to 78 GB, and the physical addresses are successively filled into the sg_list pointer.

504. Send a migration instruction to a DMA engine, where the migration instruction includes information about the scatter gather list.

After constructing the SGL, to migrate the target data from the external storage device to the internal storage device, a processor should send the instruction to the DMA engine in an HBA connected to the external storage device. The instruction includes the information about the SGL. The migration instruction is used to instruct the DMA engine to: read the target data from the external storage device, and write the target data into the internal storage device based on the physical address in the SGL.

In the prior art, because the SGL should be constructed based on the physical address, when data in the external storage device is to be migrated to the internal storage device, the data first should be transmitted to a RAM based on the SGL and then written from the RAM into the internal storage device. In this embodiment, the corresponding physical address is calculated based on the logical address to which the target data is to be migrated in the internal storage device. In this way, the scatter gather list may be constructed based on the physical address, so that the DMA engine may directly write the target data into the internal storage device based on the scatter gather list. Because an operation performed on the RAM is reduced, a quantity of times of accessing a memory controller is reduced, and impact on bandwidth of the memory controller is further reduced.

Further, in this embodiment, the access manner for the internal storage device is the volume access manner or the file access manner. After the target data is migrated to the internal storage device, a logical address is used as an address of the target data in the internal storage device. Therefore, after sending the migration instruction to the DMA engine, the processor further should calculate a corresponding logical address based on the physical address of the target data in the target internal storage device. The following describes a method in which the processor calculates the corresponding logical address based on the physical address of the target data in the internal storage device. Specifically, that the access manner for the internal storage device is the volume access manner is used as an example.

First, a volume identifier of a logical volume to which the target data is to be migrated is determined based on a physical start address of the logical volume in the internal storage device. Specifically, the ID of the logical volume to which the target data is to be migrated is queried in the mapping table described in block 201 and by using a physical start address to which the target data is to be migrated in the internal storage device.

Next, an offset address is calculated based on the volume identifier of the logical volume and the physical start address of the target data in the internal storage device. After the volume identifier of the logical volume is determined, the physical start address of the logical volume may be found in the mapping table. Because the physical start address of the target data in the internal storage device is a sum of the physical start address of the logical volume and the offset address, the offset address is a value obtained by subtracting the physical start address of the logical volume from the physical start address of the target data in the internal storage device.

The logical address to which the target data is to be migrated in the internal storage device is determined based on the volume identifier of the logical volume, the offset address, and a length of the target data.

When the access manner for the internal storage device is the file access manner, for a method for calculating a corresponding logical address based on the physical address of the target data in the internal storage device, refer to the foregoing example. A difference lies in that a file identifier of a file to which the target data is to be migrated is queried in a mapping table used to record a file system.

The foregoing describes the data migration method applied to a computer system in the embodiments of the present disclosure, and the following describes a data migration apparatus applied to a computer system in the embodiments of the present disclosure. The data migration apparatus applied to a computer system is configured to perform the foregoing data migration method applied to a computer system.

Figure 6:
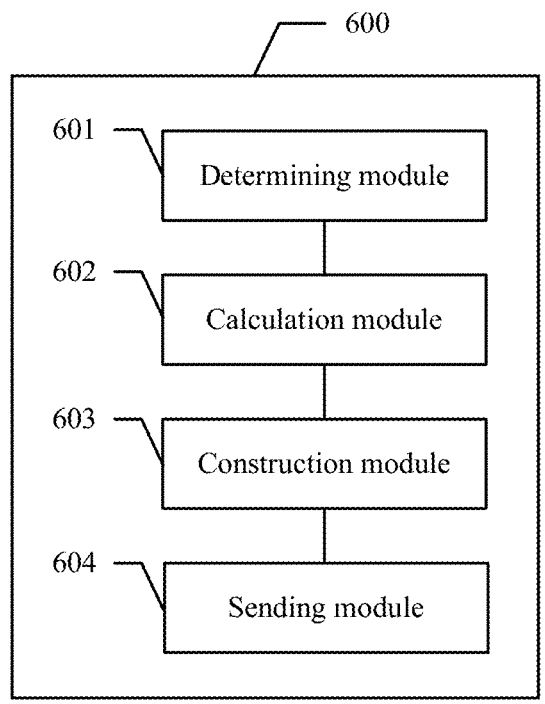
FIG. 6 is a schematic structural diagram of an embodiment of a data migration apparatus applied to a computer system according to the present disclosure.

Referring to FIG. 6, FIG. 6 is a schematic structural diagram of an embodiment of a data migration apparatus applied to a computer system according to the present disclosure. In this embodiment, the data migration apparatus 600 applied to a computer system includes:

a determining module 601, configured to determine a first address of target data, where the target data is data that is to be migrated from an internal storage device to an external storage device, the first address is a logical address of the target data in the internal storage device, the internal storage device is a persistent memory PM, and an access manner in which an operating system in the computer system accesses the internal storage device is a volume access manner or a file access manner;

a calculation module 602, configured to calculate a physical address of the target data in the internal storage device based on the first address;

a construction module 603, configured to construct a scatter gather list, where the scatter gather list includes the physical address of the target data in the internal storage device; and a sending module 604, configured to send a migration instruction to a direct memory access DMA engine, where the migration instruction includes information about the scatter gather list, and the migration instruction is used to instruct the DMA engine to: obtain the target data from the internal storage device based on the physical address, and write the target data into the external storage device.

Optionally, when the access manner for the internal storage device is the volume access manner, the first address includes a volume identifier, an offset address, and a length, the volume identifier is an identifier of a logical volume to which the target data belongs, and the calculation module is specifically configured to:

determine, based on the volume identifier, a physical start address of the logical volume to which the target data belongs in the internal storage device;

calculate a physical start address of the target data in the internal storage device based on the physical start address of the logical volume and the offset address;

and determine the physical address of the target data based on the physical start address of the target data in the internal storage device and a length of the target data.

Optionally, when the access manner for the internal storage device is the file access manner, the first address includes a file identifier, an offset address, and a length, the file identifier is an identifier of a file to which the target data belongs in a file system, and the calculation module is specifically configured to:

obtain, based on the file identifier, a physical start address of the file to which the target data belongs in the internal storage device;

calculate a physical start address of the target data in the internal storage device based on the physical start address of the file and the offset address; and determine the physical address of the target data based on the physical start address of the target data in the internal storage device and a length of the target data.

For specific description of the data migration apparatus applied to a computer system in this embodiment, refer to the description in the embodiments shown in FIG. 2 to FIG. 4. Details are not described herein.

Figure 7:
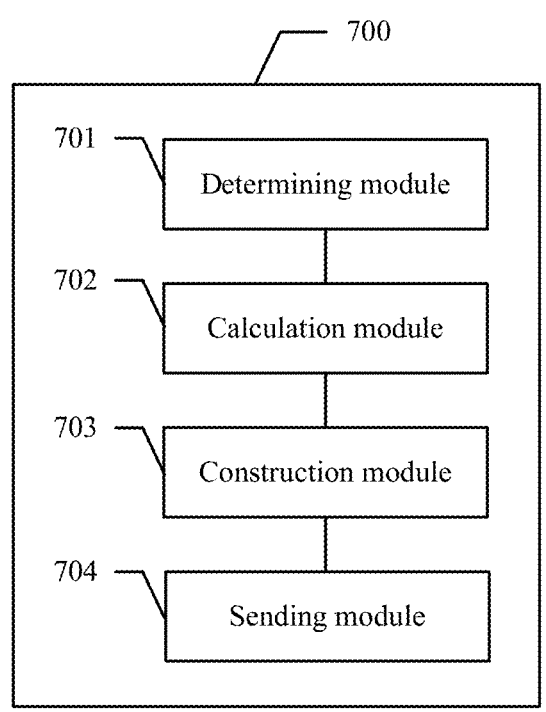
FIG. 7 is a schematic structural diagram of another embodiment of a data migration apparatus applied to a computer system according to the present disclosure.

Referring to FIG. 7, FIG. 7 is a schematic structural diagram of an embodiment of a data transmission apparatus according to the present disclosure. In this embodiment, the data transmission apparatus 700 includes:

a determining module 701, configured to determine a first address of to-be-migrated target data, where the target data is data that is to be migrated from an external storage device to an internal storage device, the first address is an address in the internal storage device, the first address is a logical address, the internal storage device is a persistent memory, and an access manner in which an operating system in the computer system accesses the internal storage device is a volume access manner or a file access manner;

a calculation module 702, configured to calculate, based on the first address, a physical address to which the target data is to be migrated in the internal storage device;

a construction module 703, configured to construct a scatter gather list, where the scatter gather list includes the physical address; and a sending module 704, configured to send a migration instruction to a DMA engine, where the migration instruction includes information about the scatter gather list, and the migration instruction is used to instruct the DMA engine to write the target data into the internal storage device based on the physical address.

Optionally, when the access manner for the internal storage device is the volume access manner, the first address includes a volume identifier, an offset address, and a length, the volume identifier is an identifier of a logical volume to which the target data is to be migrated, and the calculation module is specifically configured to:

determine, based on the volume identifier, a physical start address of the logical volume to which the target data is to be migrated in the internal storage device;

calculate, based on the physical start address of the logical volume and the offset address, a physical start address to which the target data is to be migrated in the internal storage device; and determine, based on the physical start address to which the target data is to be migrated in the internal storage device and a length of the target data, the physical address to which the target data is to be migrated in the internal storage device.

Optionally, when the access manner for the internal storage device is the file access manner, the first address includes a file identifier, an offset address, and a length, the file identifier is an identifier in a file system to which the target data is to be migrated, and the calculation module is specifically configured to:

obtain, based on the file identifier, a physical start address of a file to which the target data is to be migrated in the internal storage device;

calculate, based on the physical start address of the file and the offset address, a physical start address to which the target data is to be migrated in the internal storage device; and determine, based on the physical start address to which the target data is to be migrated in the internal storage device and a length of the target data, the physical address to which the target data is to be migrated in the internal storage device.

For specific description of the data migration apparatus applied to a computer system in this embodiment, refer to the description in the embodiment shown in FIG. 5. Details are not described herein.

The foregoing describes the data migration apparatus applied to a computer system in the embodiments of the present disclosure from a perspective of a unit functional entity, and the following describes the data migration apparatus applied to a computer system in the embodiments of the present disclosure from a perspective of hardware processing.

A specific embodiment of the data migration apparatus applied to a computer system in the present disclosure is a processor in the computer system shown in FIG. 2. The processor is configured to: by using the methods in the embodiments shown in FIG. 2 to FIG. 5, construct a scatter gather list and send a migration instruction to a DMA engine, so as to instruct the DMA engine to migrate data in an external storage device in the computer system to an internal storage device based on the migration instruction, or instruct the DMA engine to migrate data in an internal storage device in the computer system to an external storage device based on the migration instruction.

In the several embodiments provided in this application, it should be understood that the disclosed system, apparatus, and method may be implemented in other manners. For example, the described apparatus embodiment is only an example. In addition, functional modules in the embodiments of the present disclosure may be integrated into one processing unit, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the blocks of the methods described in the embodiments of the present disclosure. The storage medium includes: any medium that can store program code, such as a USB flash drive, a removable hard disk, a read-only memory (ROM), a random access memory (RAM), a magnetic disk, or an optical disc.

What is claimed is:

1. A data migration method, comprising:
   determining a first address of a target data, wherein the target data is to be migrated from an internal storage device to an external storage device, the first address comprises a logical address of the target data in the internal storage device, and an access manner in which an operating system in a computer system accesses the internal storage device comprises a volume access manner or a file access manner;
   calculating a physical address of the target data in the internal storage device based on the first address and a mapping table, wherein the mapping table contains a plurality of physical start addresses and lengths of logical volumes identified by volume identifiers when the access manner for the internal storage device comprises the volume access manner or the mapping table contains a plurality of physical start addresses of files identified by file identifiers when the access manner for the internal storage device comprises the file access manner;
   constructing a scatter gather list, wherein the scatter gather list comprises the physical address of the target data in the internal storage device; and
   sending a migration instruction to a direct memory access (DMA) engine, wherein the migration instruction comprises information about the scatter gather list, and the migration instruction is used to instruct the DMA engine to: obtain the target data from the internal storage device based on the physical address, and write the target data into the external storage device.

2. The method of claim 1, wherein the access manner for the internal storage device comprises the volume access manner, the first address comprises a volume identifier, an offset address, and a length of the target data, the volume identifier comprises an identifier of a logical volume to which the target data belongs, and calculating the physical address of the target data comprises:
   determining, by querying the mapping table based on the volume identifier, a physical start address of the logical volume to which the target data belongs in the internal storage device;
   calculating a physical start address of the target data in the internal storage device based on the physical start address of the logical volume and the offset address; and
   determining the physical address of the target data based on the physical start address of the target data in the internal storage device and the length of the target data.

3. The method of claim 1, wherein when the access manner for the internal storage device comprises the file access manner, the first address comprises a file identifier, an offset address, and a length of the target data, the file identifier comprises an identifier of a file to which the target data belongs in a file system, and calculating the physical address of the target data comprises:
   obtaining, by querying the mapping table based on the file identifier, a physical start address of the file to which the target data belongs in the internal storage device;
   calculating a physical start address of the target data in the internal storage device based on the physical start address of the file and the offset address; and
   determining the physical address of the target data based on the physical start address of the target data in the internal storage device and the length of the target data.

4. A data migration method, comprising:
   determining a first address of target data, wherein the target data is to be migrated from an external storage device to an internal storage device, the first address comprises an address in the internal storage device, the first address comprises a logical address, and an access manner in which an operating system in the computer system accesses the internal storage device comprises a volume access manner or a file access manner;
   calculating, based on the first address and a mapping table, a physical address to which the target data is to be migrated in the internal storage device, wherein the mapping table contains a plurality of physical start addresses and lengths of logical volumes identified by volume identifiers when the access manner for the internal storage device comprises the volume access manner or the mapping table contains a plurality of physical start addresses of files identified by file identifiers when the access manner for the internal storage device comprises the file access manner;
   constructing a scatter gather list, wherein the scatter gather list comprises the physical address; and
   sending a migration instruction to a DMA engine, wherein the migration instruction comprises information about the scatter gather list, and the migration instruction is used to instruct the DMA engine to write the target data into the internal storage device based on the physical address.

5. The method of claim 4, wherein when the access manner for the internal storage device comprises the volume access manner, the first address comprises a volume identifier, an offset address, and a length of the target data, the volume identifier comprises an identifier of a logical volume to which the target data is to be migrated, and the calculating the physical address comprises:
   determining, by querying the mapping table based on the volume identifier, a physical start address of the logical volume to which the target data is to be migrated in the internal storage device;
   calculating, based on the physical start address of the logical volume and the offset address, a physical start address to which the target data is to be migrated in the internal storage device; and
   determining, based on the physical start address to which the target data is to be migrated in the internal storage device and the length of the target data, the physical address to which the target data is to be migrated in the internal storage device.

6. The method of claim 4, wherein when the access manner for the internal storage device comprises the file access manner, the first address comprises a file identifier, an offset address, and a length of the target data, the file identifier comprises an identifier of a file to which the target data is to be migrated in a file system, and the calculating, the physical address comprises:
   obtaining, by querying the mapping table based on the file identifier, a physical start address of the file to which the target data is to be migrated in the internal storage device;
   calculating, based on the physical start address of the file and the offset address, a physical start address to which the target data is to be migrated in the internal storage device; and determining, based on the physical start address to which the target data is to be migrated in the internal storage device and the length of the target data, the physical address to which the target data is to be migrated in the internal storage device.

7. A computer system, comprising:
an internal storage device, wherein the internal storage device stores target data which is to be migrated from the internal storage device to an external storage device, and an access manner in which an operating system in the computer system accesses the internal storage device comprises a volume access manner or a file access manner; and
a processor, configured to:
determine a first address of the target data, wherein the first address comprises a logical address of the target data in the internal storage device;
calculate a physical address of the target data in the internal storage device based on the first address and a mapping table, wherein the mapping table contains a plurality of physical start addresses and lengths of logical volumes identified by volume identifiers when the access manner for the internal storage device comprises the volume access manner or the mapping table contains a plurality of physical start addresses of files identified by file identifiers when the access manner for the internal storage device comprises the file access manner;
construct a scatter gather list, wherein the scatter gather list comprises the physical address of the target data in the internal storage device; and
send a migration instruction to a DMA engine, wherein the migration instruction comprises information about the scatter gather list, and the migration instruction is used to instruct the DMA engine to: obtain the target data from the internal storage device based on the physical address, and write the target data into the external storage device.

8. The computer system of claim 7, wherein when the access manner for the internal storage device comprises the volume access manner, the first address comprises a volume identifier, an offset address, and a length of the target data, the volume identifier comprises an identifier of a logical volume to which the target data belongs, and the processor is further configured to:
determine, from the mapping table based on the volume identifier, a physical start address of the logical volume to which the target data belongs in the internal storage device;
calculate a physical start address of the target data in the internal storage device based on the physical start address of the logical volume and the offset address; and
determine the physical address of the target data based on the physical start address of the target data in the internal storage device and the length of the target data.

9. The computer system of claim 7, wherein when the access manner for the internal storage device comprises the file access manner, the first address comprises a file identifier, an offset address, and a length of the target data, the file identifier comprises an identifier of a file to which the target data belongs in a file system, and the processor is further configured to:
obtain, from the mapping table based on the file identifier, a physical start address of the file to which the target data belongs in the internal storage device;

calculate a physical start address of the target data in the internal storage device based on the physical start address of the file and the offset address; and
determine the physical address of the target data based on the physical start address of the target data in the internal storage device and the length of the target data.

10. A computer system, comprising:
an internal storage device, wherein an access manner in which an operating system in the computer system accesses the internal storage device comprises a volume access manner or a file access manner;
an external storage device, configured to store target data, wherein the target data is to be migrated from the external storage device to the internal storage device; and
a processor, configured to:
calculate a physical address of the target data in the internal storage device based on a first address and a mapping table, wherein the first address comprises an address in the internal storage device, and the first address comprises a logical address, and wherein the mapping table contains a plurality of physical start addresses and lengths of logical volumes identified by volume identifiers when the access manner for the internal storage device comprises the volume access manner or the mapping table contains a plurality of physical start addresses of files identified by file identifiers when the access manner for the internal storage device comprises the file access manner;
construct a scatter gather list, wherein the scatter gather list comprises the physical address; and
send a migration instruction to a DMA engine, wherein the migration instruction comprises information about the scatter gather list, and the migration instruction is used to instruct the DMA engine to write the target data into the internal storage device based on the physical address.

11. The computer system of claim 10, wherein when the access manner for the internal storage device comprises the volume access manner, the first address comprises a volume identifier, an offset address, and a length of the target data, the volume identifier comprises an identifier of a logical volume to which the target data is to be migrated, and the processor is further configured to:
determine, from the mapping table based on the volume identifier, a physical start address of the logical volume to which the target data is to be migrated in the internal storage device;
calculate, based on the physical start address of the logical volume and the offset address, a physical start address to which the target data is to be migrated in the internal storage device; and
determine, based on the physical start address to which the target data is to be migrated in the internal storage device and the length of the target data, the physical address to which the target data is to be migrated in the internal storage device.

12. The computer system of claim 10, wherein when the access manner for the internal storage device comprises the file access manner, the first address comprises a file identifier, an offset address, and a length of the target data, the file identifier comprises an identifier of a file to which the target data is to be migrated in a file system, and the processor is further configured to:
obtain, from the mapping table based on the file identifier, a physical start address of a file to which the target data is to be migrated in the internal storage device;

calculate, based on the physical start address of the file and the offset address, a physical start address to which the target data is to be migrated in the internal storage device; and determine, based on the physical start address to which the target data is to be migrated in the internal storage device and the length of the target data, the physical address to which the target data is to be migrated in the internal storage device.

* * * * *